(12) United States Patent
Blanchard (10) Patent No.: US 7,762,739 B2
(45) Date of Patent: Jul. 27, 2010

(54) FASTENER AND ASSEMBLY UTILIZING THE SAME

(75) Inventor: Bradley V. Blanchard, White Lake, MI (US)

(73) Assignee: Strategic Ideas, LLC, Detroit, MI (US)

(*) Notice: Subject to any disclaimer, the term of this patent is extended or adjusted under 35 U.S.C. 154(b) by 249 days.

(21) Appl. No.: 11/848,917

(22) Filed: Aug. 31, 2007

(65) Prior Publication Data

US 2009/0060644 A1  Mar. 5, 2009

(51) Int. Cl.
*F16B 21/00* (2006.01)

(52) U.S. Cl. .................. 403/322.2; 403/322.3; 403/325; 56/2

(58) Field of Classification Search ............. 403/322.1, 403/322.2, 322.3, 325; 74/16; 56/2, 16.7
See application file for complete search history.

(56) References Cited

U.S. PATENT DOCUMENTS

| | | | |
|---|---|---|---|
| 1,054,126 A | 2/1913 | Lindberg | |
| 1,353,299 A | 9/1920 | Wilson | |
| 1,468,732 A | 9/1923 | Bradbury | |
| 2,452,430 A | 10/1948 | Clark et al. | |
| 2,461,699 A | 2/1949 | Scheiwer | |
| 2,674,469 A | 4/1954 | Earle et al. | |
| 2,695,071 A | 11/1954 | Hupp | |
| 2,816,471 A * | 12/1957 | Bachman | 411/348 |
| 2,864,293 A | 12/1958 | Edrich et al. | |
| 2,975,839 A | 3/1961 | Burrows et al. | |
| 3,002,368 A * | 10/1961 | Moberg | 70/14 |
| 3,040,590 A | 6/1962 | Smithburn | |
| 3,112,767 A | 12/1963 | Cator | |
| 3,183,586 A * | 5/1965 | Sellers | 29/441.1 |
| 3,302,960 A | 2/1967 | Herrmann | |
| 3,317,220 A | 5/1967 | Bruning | |
| 3,436,086 A | 4/1969 | Glenzer | |
| 3,469,871 A | 9/1969 | Betts | |
| 3,521,895 A | 7/1970 | Smith | |
| 3,603,162 A | 9/1971 | Gohler et al. | |
| 3,650,578 A | 3/1972 | DelVecchio et al. | |
| 3,744,569 A | 7/1973 | Ehrlich | |
| 3,809,121 A | 5/1974 | Harris | |
| 3,817,560 A | 6/1974 | Guertin | |
| 3,822,951 A | 7/1974 | Bornzin | |
| 3,888,559 A | 6/1975 | Geib | |

(Continued)

*Primary Examiner*—Michael P Ferguson
(74) *Attorney, Agent, or Firm*—Honigman Miller Schwartz and Cohn LLP (57) ABSTRACT

A fastener is disclosed. The fastener includes a housing, a cage, one or more retaining members, and a plunger. The housing defines a housing cavity. The housing cavity includes a recess. The cage is disposed at least partially in the housing cavity. The cage includes a cage cavity and one or more passages in the cage aligned with the recess. The one or more retaining members are retained within the one or more passages. The plunger is movable in the ball cage cavity between a first position to cause the one or more balls to be displaced outwardly relative the one or more passages to seat the one or more retaining members in the recess thereby mechanically locking the housing to the ball cage, and a second position thereby allowing the one or more retaining members to be displaced radially inwardly relative the one or more passages to cause the one or more retaining members to be unseated from the recess.

13 Claims, 6 Drawing Sheets

U.S. PATENT DOCUMENTS

| | | |
|---|---|---|
| 3,929,343 A | 12/1975 | Wanner et al. |
| 4,014,467 A | 3/1977 | Ferguson |
| 4,016,914 A | 4/1977 | Zurko |
| 4,120,232 A * | 10/1978 | Hoffman, Jr. ................. 89/1.51 |
| 4,366,945 A | 1/1983 | Blauenstein et al. |
| 4,437,647 A | 3/1984 | Cruse |
| 4,453,449 A | 6/1984 | Hollmann |
| 4,546,956 A | 10/1985 | Moberg et al. |
| 4,597,203 A | 7/1986 | Middleton |
| 4,616,952 A | 10/1986 | Schott et al. |
| 4,642,976 A | 2/1987 | Owens |
| 4,709,454 A | 12/1987 | Barnes et al. |
| 4,749,301 A | 6/1988 | Suzuki et al. |
| 4,803,831 A | 2/1989 | Carmine |
| 4,813,810 A | 3/1989 | Suzuki et al. |
| 4,815,495 A | 3/1989 | Remsburg |
| 4,938,622 A | 7/1990 | Stoerzbach |
| 4,941,862 A | 7/1990 | Hazebrook et al. |
| 4,960,344 A | 10/1990 | Geisthoff et al. |
| 4,978,150 A | 12/1990 | Schoot |
| 5,013,194 A | 5/1991 | Wienhold |
| 5,066,049 A | 11/1991 | Staples |
| 5,076,324 A | 12/1991 | Herman et al. |
| 5,083,818 A | 1/1992 | Schoot |
| 5,251,428 A | 10/1993 | Gay |
| 5,255,714 A | 10/1993 | Mullins |
| 5,265,970 A | 11/1993 | LaBarre |
| 5,312,084 A | 5/1994 | Weh et al. |
| 5,335,947 A | 8/1994 | Remsburg |
| 5,366,313 A | 11/1994 | LaBarre |
| 5,464,229 A | 11/1995 | Salpaka |
| 5,471,899 A | 12/1995 | Twomlow |
| 5,474,024 A | 12/1995 | Hallock |
| 5,496,080 A * | 3/1996 | Chabanne et al. ......... 403/322.2 |
| 5,520,253 A | 5/1996 | Kesting |
| 5,573,255 A | 11/1996 | Salpaka |
| 5,603,353 A | 2/1997 | Clark et al. |
| 5,692,851 A | 12/1997 | Pace |
| 5,775,074 A * | 7/1998 | Walter ............................. 56/2 |
| 5,787,693 A | 8/1998 | Dyke et al. |
| 5,826,414 A | 10/1998 | Lenczuk |
| 5,896,931 A | 4/1999 | Roberts et al. |
| 6,224,522 B1 | 5/2001 | Ervin |
| 6,331,091 B2 | 12/2001 | Cross |
| 6,371,683 B1 * | 4/2002 | Draney et al. ............... 403/325 |
| 6,439,797 B1 | 8/2002 | Campbell |
| 6,561,523 B1 | 5/2003 | Wienhold |
| 6,643,959 B2 | 11/2003 | Jolliff et al. |
| 6,675,562 B2 | 1/2004 | Lawrence |
| 6,761,519 B2 | 7/2004 | Alderman |
| 6,922,981 B1 | 8/2005 | Tyree |
| 6,941,739 B1 | 9/2005 | Gliser |
| 6,948,685 B2 * | 9/2005 | Hawthorne .............. 244/129.1 |
| 7,497,459 B2 * | 3/2009 | Johnson et al. ............. 280/515 |

\* cited by examiner

FASTENER AND ASSEMBLY UTILIZING THE SAME

FIELD OF THE INVENTION

The disclosure relates to fasteners and more particularly relates to quick disconnect fasteners and to an assembly utilizing the same.

DESCRIPTION OF THE RELATED ART

Fasteners are known in the art and are typically utilized for joining two or more articles together. Conventional fasteners may include, for example, screws, bolts and nuts (i.e., more commonly generically referred to in the art as a 'threaded fastener'), VELCRO® (i.e., more commonly referred to in the art as a 'hook and loop fastener'), or other, more complex mechanical devices and linkages.

Although adequate for most applications, there is a need in the art for an improved fastener that permits a user to quickly and conveniently join and then disconnect two or more articles.

BRIEF DESCRIPTION OF THE DRAWINGS

The disclosure will now be described, by way of example, with reference to the accompanying drawings, in which.

DETAILED DESCRIPTION OF THE INVENTION

The Figures illustrate an exemplary embodiment of a fastener and assembly utilizing the same in accordance with an embodiment of the invention. Based on the foregoing, it is to be generally understood that the nomenclature used herein is simply for convenience and the terms used to describe the invention should be given the broadest meaning by one of ordinary skill in the art.

Figure 1:
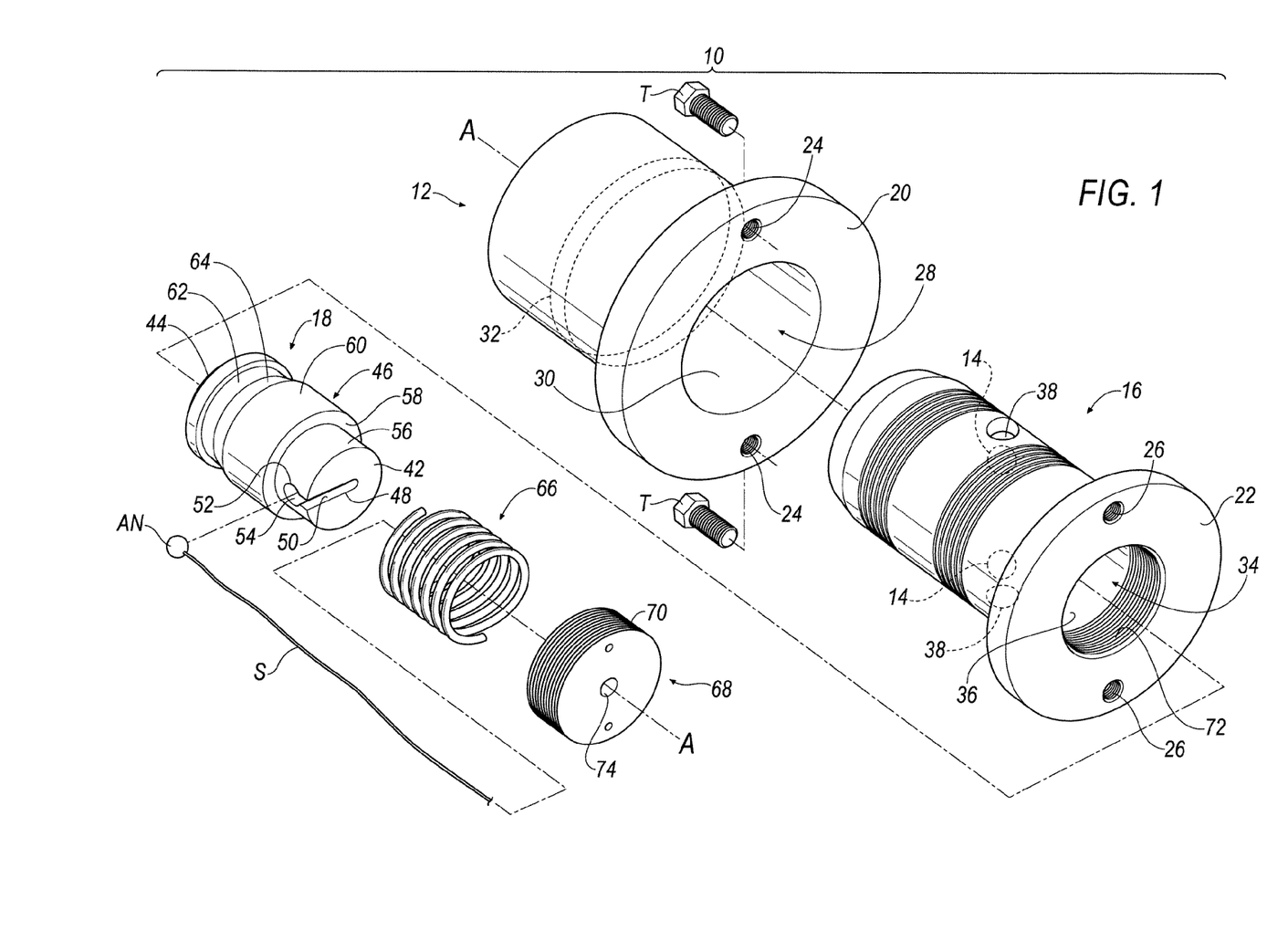
FIG. 1 is a an exploded isometric view of a fastener in accordance with an exemplary embodiment of the invention.
Figure 2A:
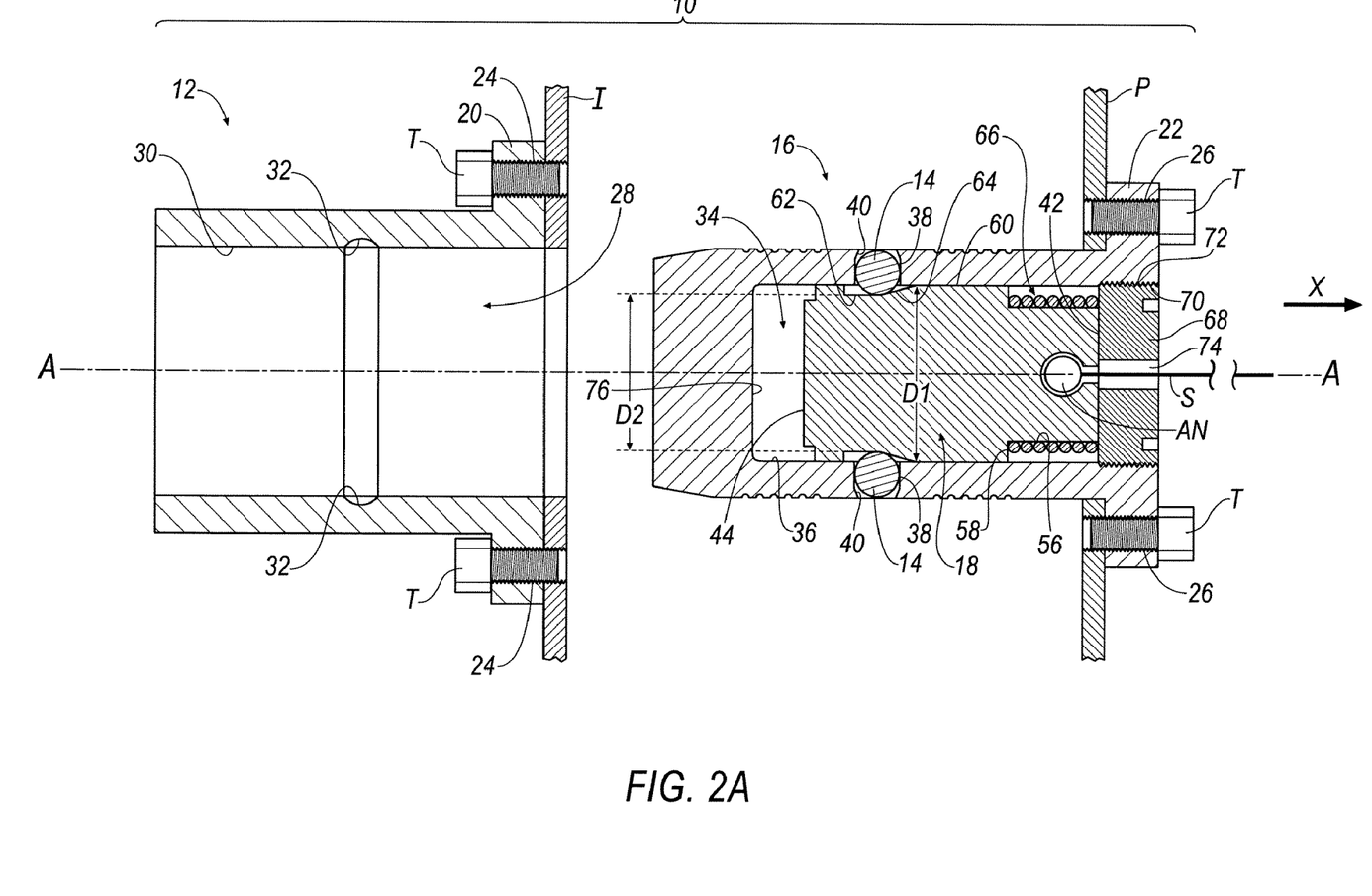
FIG. 2A is cross-sectional view of the fastener of FIG. 1 in a disconnected fully disengaged state in accordance with an exemplary embodiment of the invention.
Figure 2B:
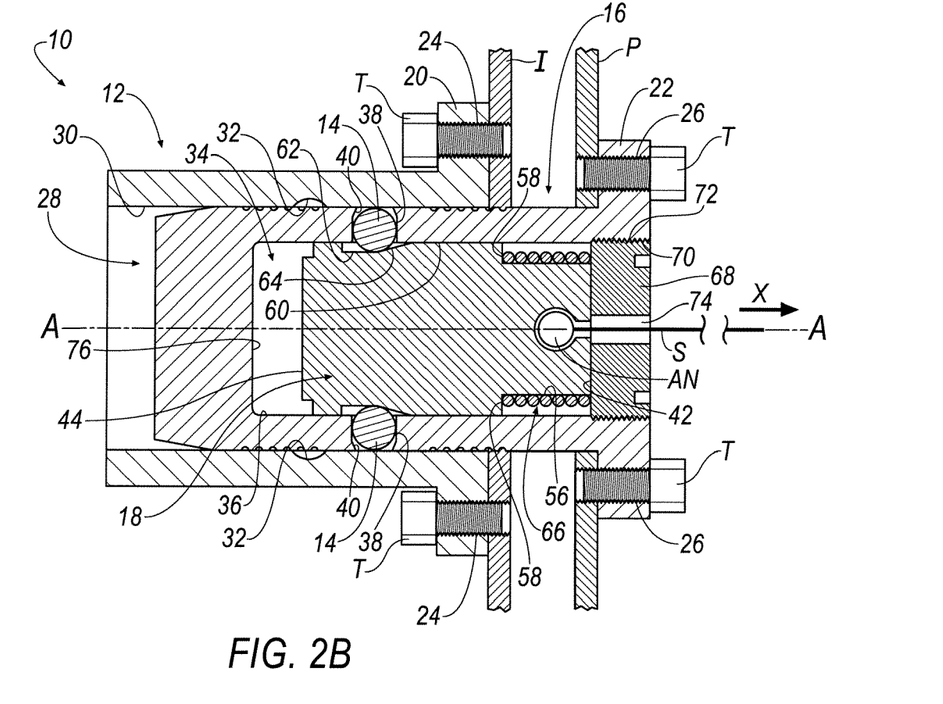
FIG. 2B is another cross sectional view of the fastener of FIG. 1 in a disconnected, partially disengaged state in accordance with an exemplary embodiment of the invention.
Figure 2C:
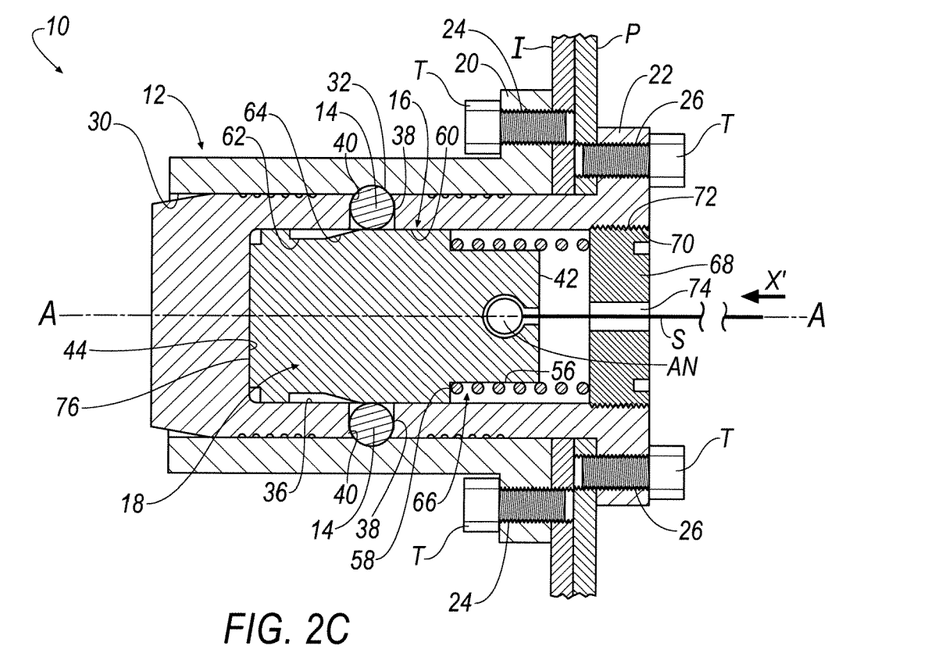
FIG. 2C is a cross-sectional view of the fastener of FIG. 1 in a connected, fully engaged state in accordance with an exemplary embodiment of the invention.

Referring to FIGS. 1-2C, a fastener is shown generally at 10 according to an embodiment. In an embodiment, the fastener 10 generally includes, for example, a housing 12, one or more retaining members 14, such as for example generally spherical retaining members 14, a cage 16, and a plunger 18. As will be explained in greater detail below, axial movement of the plunger 18 along a longitudinal axis, A-A, results in radial movement of the retaining members 14 relative the axis, A-A, to effect interlocking (see, e.g., FIG. 2C) or unlocking (see, e.g., FIG. 2B) of the housing 12 and cage 16.

In an embodiment, the housing 12 may be attached to an implement, I (FIGS. 2A-2C, 4A-5B). In an embodiment, the cage 16 may be attached to a power unit, P (FIGS. 2A-2C, 4A-5B). However, it will be appreciated that, in an embodiment, the reverse condition may occur in that the housing 12 is attached to the power unit, P, and the ball cage may be attached to the implement, I.

According to an embodiment, the housing 12/cage 16 assembly may be attached to the implement, I/power unit, P, by any desirable fastening method, such as, for example, welding or a threaded fastener, T. As seen in FIGS. 1-2C, the housing 12 may include an annular end portion 20, and the cage 16 may also include an annular end portion 22 each having respective threaded passages 24, 26 for receiving a threaded fastener, T. Although threaded fasteners, T, are disclosed, it will be appreciated that other fasteners, such as, for example, rivets, welds, or the like may be utilized to attach the housing 12/cage 16 to the implement, I/power unit, P.

Referring to FIG. 1, the fastener 10 housing 12 which may include a cavity 28 for receiving at least a portion of the cage 16. The housing cavity 28 is generally defined by a substantially cylindrical bore having a surface 30. As seen in FIG. 2A, the surface 30 is defined to include a recess 32 (which may be an a single bore, a series of spaced bores, or a continuous annular recess) for partially receiving the one or more retaining members 14. Although FIGS. 1-3B depict two retaining members (spaced 180° apart from one another), it is contemplated that one or more retaining members could be used. For example, the use of three equally spaced retaining members 14 (i.e. spaced 120° apart) has the advantage of the minimum number of retaining members 14, that permit plunger 18 to be centered within cavity 28.

Referring to FIG. 1, the cage 16 may further include a cavity 34 for receiving at least a portion of the plunger 18. The cavity 34 is hereinafter referred to as a cage cavity 34. In an embodiment, the cage cavity 34 may be generally defined by a substantially cylindrical bore having a surface 36.

In an embodiment, the cage 16 further may include one or more passages, which are shown generally at 38, for partially receiving the one or more retaining members 14. Retaining members are depicted as spherical members (e.g. steel ball bearings) but it is contemplated that other geometries (such as pins, etc.) will function equally as well. Passages 38 may include at least in part a radial passage component. In an embodiment, as seen in FIGS. 2A-2C, one or more passages 38 may include retaining portions, which are shown generally at 40, for partially retaining the one or more retaining members 14 proximate the one or more passages 38 when the cage 16 is removed from the housing cavity 28. Other means for retaining members 14 in cage 16 are well known to those skilled in the art.

Referring to FIG. 1, the plunger 18 may include a substantially cylindrical body that is sized to be at least partially disposed within the cage cavity 34. In an embodiment, the plunger 18 may include a first axial end 42, a second axial end 44, and a side surface 46 between the first axial end 42 and the second axial end 44.

The first axial end 42 may further include a first opening 48 that extends from the side surface 46 to approximately a central area of the first end 42 where a central axis, A-A, of the fastener 10 would otherwise traverse or extend there-through. The first opening 48 defines a passage 50 formed in the plunger 18 in the shape of, according to an embodiment, a slit that permits axial passage of a cable, thread, string, or the like, which is shown generally at S.

Referring to FIG. 1, the plunger 18 includes a second opening 52 formed in the side surface 46 that defines passage 54 formed in the plunger 18 for permitting passage of an anchor, AN, attached to an end of the cable, S. Passage 54 may have, at least in part, a radial component, and passage 50 may have, in part, an axial component. In an embodiment, the axial passage 50 and radial passage 54 are in fluid communication with one another such that upon disposing the anchor, AN, in the radial passage 54, the cable, S, extending from the anchor, AN, may axially extend from the plunger 18 and through the axial passage 50. Other means of attaching a cable to a member are well-known to those skilled in the art (such as crimping, gluing, threading, etc.) and do not necessarily require an anchor AN.

Referring to FIGS. 1-2C, the side surface 46 of the plunger 18 is defined to include several surfaces 56-64. First, the side surface 46 may include a neck surface portion 56 for locating and retaining an urging member 66 and a shoulder surface portion 58 for forming a reaction surface for urging member 66. A portion of urging member 66 may urge against surface 58. Urging member 66 may be any known urging device, such as a coil spring, gas charged cylinder, compressible body (such as rubber) or the like. If member 66 is a coil spring, the coils of the spring member 66 can be concentrically disposed about the neck surface portion 56 whereas the shoulder surface portion 58 can provide a seating surface for an end coil of the spring member 66.

The side surface 46 of the plunger 18 may further include a first retaining member engagement surface 60. In an embodiment, the first retaining member engagement surface 60 defines an axial segment of the plunger 18 to include a first diameter, D1 (see, e.g. FIG. 2A). The first retaining member engagement surface 60 may, in an embodiment, contact the surface 36 of the cage cavity 34, or, in an embodiment, is positioned substantially close to the surface 36 of the cage cavity 34 when the plunger 18 is disposed in the cage 16.

The side surface 46 of the plunger 18 may further include a second retaining member engagement surface 62. In an embodiment, the second retaining member engagement surface 62 defines an axial segment of the plunger 18 to include a second diameter, D2 (see, e.g., FIG. 2A), that is less than the first diameter, D1.

The side surface 46 of the plunger 18 may further include an intermediate retaining member engagement surface 64 located between the first retaining member engagement surface 60 and the second retaining member engagement surface 62. The intermediate retaining member engagement surface 64 does not define an axially parallel segment of the plunger 18 to include a constant diameter (as related to, for example, diameters D1, D2), but rather, defines a sloped or ramped surface (e.g. a frusto-conical surface).

Although the plunger 18 is described to include retaining member engagement surfaces 60-64 having constant and non-constant diameter axial segments, it will be appreciated that the plunger 18 is not limited to the configurations disclosed above. For example, in an embodiment, the intermediate retaining member engagement surface 64 is not limited to define the plunger 18 having a frusto-conical axial segment; for example, in an alternative embodiment, the intermediate retaining member engagement surface 64 may define the plunger 18 to have a non-conical axial segment, such as, for example a concave or convex segment.

Referring to FIG. 1, the fastener 10 may include a plug member 68. Plug member may be at least partially disposed in the cage cavity 34. Plug member 68 may form a reaction surface for urging member 66. In an embodiment, the plug member 68 may include an outer threaded surface 70 that threadingly-cooperates with a threaded surface 72 formed in the surface 36 of the cage cavity 34. The plug member 68 also includes an axial passage 74 that permits axial passage of the cable, S.

Upon disposing the retaining members 14, plunger 18, urging member 66 and plug member 68 in the cage 16, radial movement of the one or more retaining members 14 may be provided by axially moving the plunger 18 within the cage cavity 34. In an embodiment, the one or more retaining members 14 that are radially retained by the cage 16 will contact, at any given time, at least one of the first, second, and intermediate retaining member engagement surfaces 60-64, and, because of the differences in diameter and the frusto-conical shape of the axial segment of the plunger 18 as defined by the surfaces 60-64, the one or more retaining members 14 may be radially displaced according to the particular surface 60-64 that the one or more retaining members 14 is in contact with.

For example, when the cable, S, is pulled in the direction of arrow, X (see, e.g., FIG. 2A), the first end 42 of the plunger 18 is positioned substantially adjacent the plug member 68 such that the urging member 66 is compressed and one or more retaining members 14 are no longer biased radially outwardly and they are free to move radially inwardly to contact the second retaining member engagement surface 62. Because the second retaining member engagement surface 62 has a diameter, D2, that is less than the diameter, D1, the one or retaining members 14 will be radially inwardly displaced when cage 16 is withdrawn from cavity 28 of housing 12.

In another example, when the cable, S, is released, the urging member 66 causes the plunger 18 to move axially away from the plug member 68 in a direction of arrow X' (opposite the arrow X) such that the one or more retaining members 14 contacts, and rides radially outwardly along, the intermediate retaining member engagement surface 64. Accordingly, because the intermediate retaining member engagement surface 64 includes larger diameters at each axial segment of the surface 64 than that of diameter, D2, the one or more retaining members 14 are radially displaced outwardly (away from the axis, A-A).

Now referring to FIG. 2C, as the urging member 66 causes the plunger 18 to move even further away from the plug member 68, the second end 44 of the plunger 18 contacts a bottom surface 76 of the cage cavity 34 such that the one or more retaining members 14 may then contact the first retaining member engagement surface 60 of plunger 18. Because the retaining member engagement surface 60 includes a larger diameter, D1, than that of the second and intermediate retaining member engagement surfaces 62, 64, the one or more retaining members 14 may be biased radially outwardly further from the axis, A-A, than that when the one or more retaining members 14 contact the second or intermediate surfaces 62, 64.

As seen in FIG. 2C, when the cage 16 having the one or more retaining members 14, plunger 18, and plug member 68 is disposed in the housing cavity 28, the one or more retaining members 14 may be radially aligned with the recess 32 formed in the surface 30 of the housing cavity 28. Thus, when the plunger 18 is axially moved as described above, the radial displacement of the one or more retaining members 14 may permit the one or more retaining members 14 to be in selective radial communication with the recess 32.

For example, when the one or more retaining members 14 contact the first engagement surface 60 of the plunger 18, the one or more retaining members 14 may be displaced radially outwardly relative the axis, A-A, to engage the recess 32 and thereby come into contact with the housing 12. Because the one or more retaining members 14 is/are generally disposed in the one or more radial passages 38 of the cage 16, and, because the one or more retaining members 14 may at least partially engage the recess 32 to thereby contact housing 12, the end result of the radially outward positioning of the one or more retaining members 14 relative the housing 12 and cage 16 results in the locking/coupling of the housing 12 and the cage 16. Conversely, when the one or more retaining members 14 contact the second engagement surface 62 of the plunger 18 (see, e.g., FIGS. 2A and 2B), the one or more retaining members 14 are free to be displaced radially inwardly relative the axis, A-A; accordingly, when the one or more retaining members 14 are displaced radially inwardly, the one or more retaining members 14 are disengaged from the recess 32, and, as a result, no longer contact the housing 12 to result in the unlocking/uncoupling of the housing 12 and cage 16. Thus, the axial movement of the plunger 18 that translates into radial movement of the one or more retaining members 14 relative the axis, A-A, results in the quick and convenient connecting and disconnecting of articles (e.g. the implement, I, and power unit, P) that the housing 12 and cage 16 are attached to by way of, for example, threaded fasteners, T.

Figure 3A:
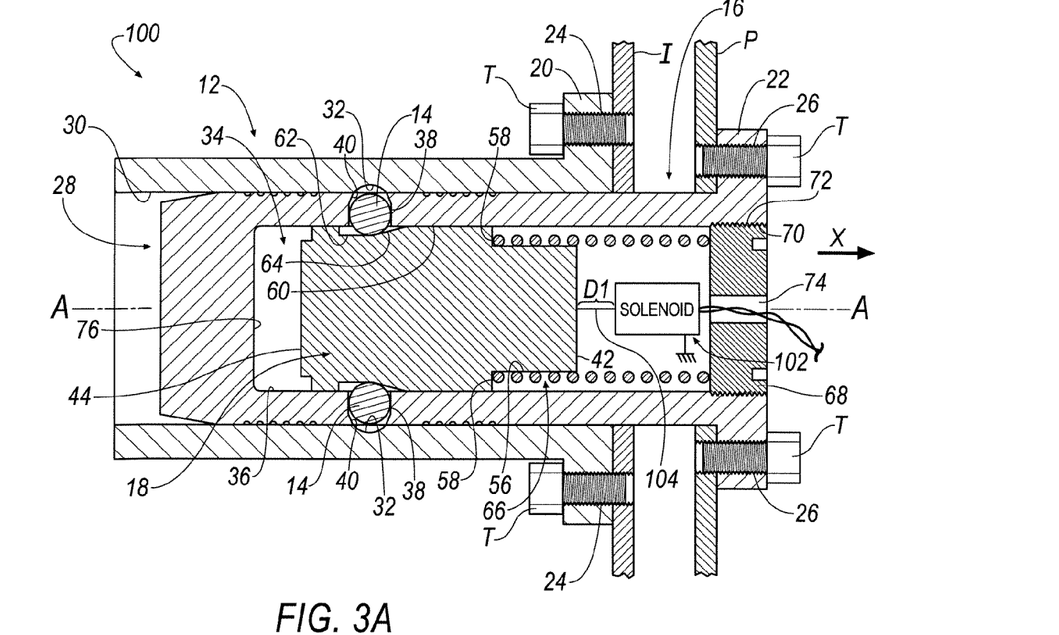
FIG. 3A is a cross-sectional view of a fastener in a disconnected state in accordance with an exemplary embodiment of the invention.
Figure 3B:
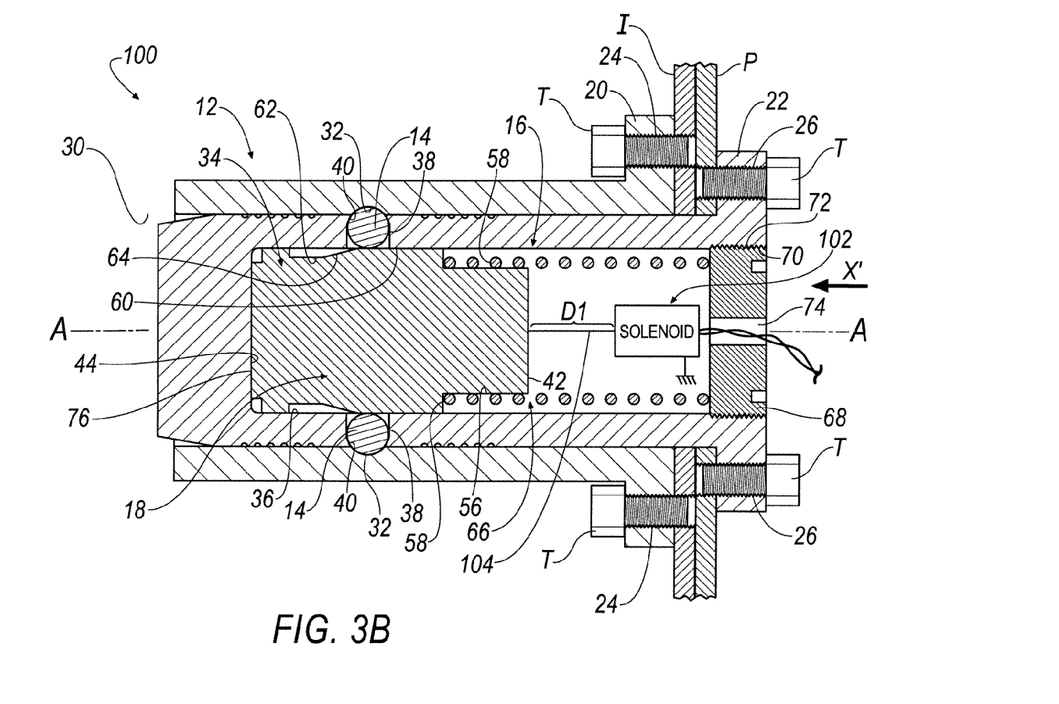
FIG. 3B is a cross-sectional view of a fastener in a connected state in accordance with an exemplary embodiment of the invention.

Referring to FIGS. 3A and 3B, a fastener is shown generally at 100 according to an embodiment. The fastener 100 is substantially similar to the fastener 10 with the exception of a solenoid driving mechanism 102 that replaces the cable, S, and anchor, AN. As illustrated, when electrical current is applied to the solenoid 102, a mechanical coupling 104 extending from the solenoid 102 draws the plunger 18 axially toward the plug member 68 (see, e.g., FIG. 3A). Conversely, when no electrical current is applied to the solenoid 102, the urging member 66 axially moves the plunger 18 toward the bottom surface 76 of the cage cavity 34 (see, e.g., FIG. 3B).

Figure 4A:
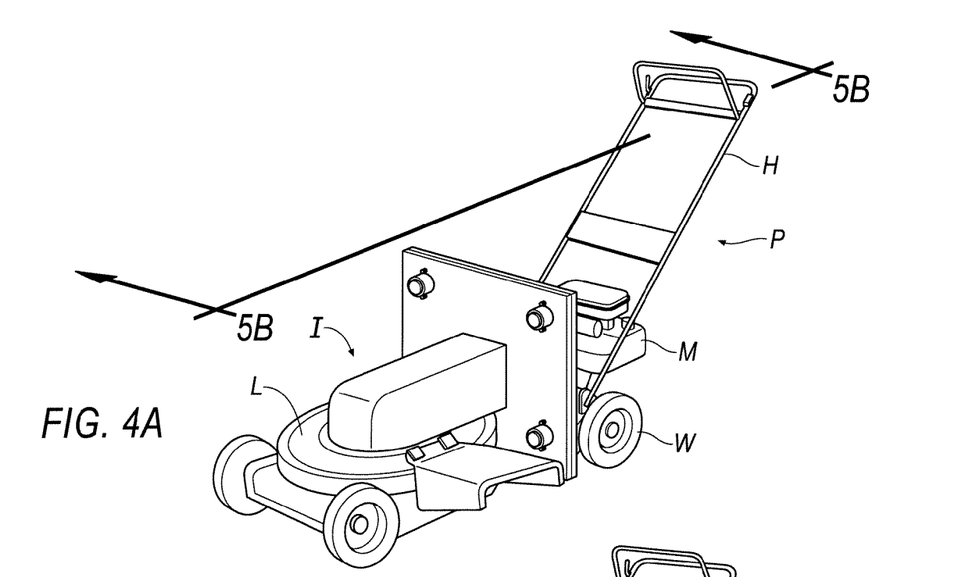
FIG. 4A is an isometric view of an assembly joined by way of a fastener in accordance with an exemplary embodiment of the invention.
Figures 4B, 4C:
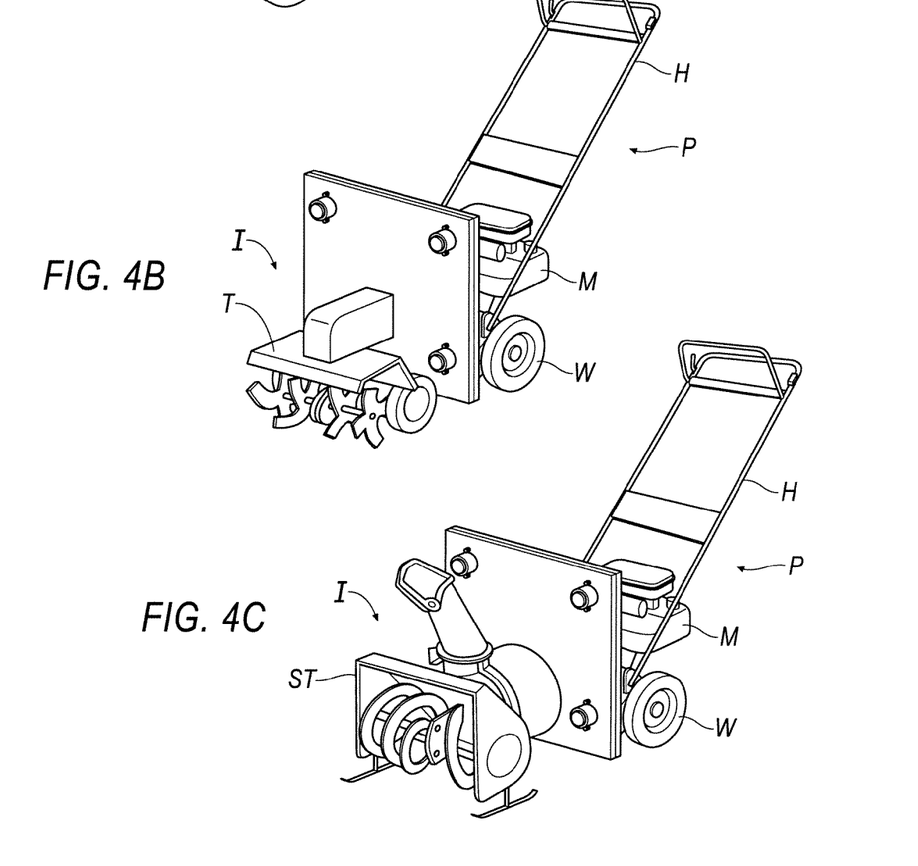
FIG. 4B is an isometric view of an assembly joined by way of a fastener in accordance with an exemplary embodiment of the invention.
FIG. 4C is an isometric view of an assembly joined by way of a fastener in accordance with an exemplary embodiment of the invention.

Referring to FIGS. 4A-4C, a power unit, P, is defined to generally include an integral prime mover, M, and handle, H, that are supported by wheels, W. The implement, I, may include any desirable device including, for example, a lawn mower, L (FIG. 4A), a tiller, T (FIG. 4B), a snow thrower, ST (FIG. 4C), or the like.

Figures 5A, 5B:
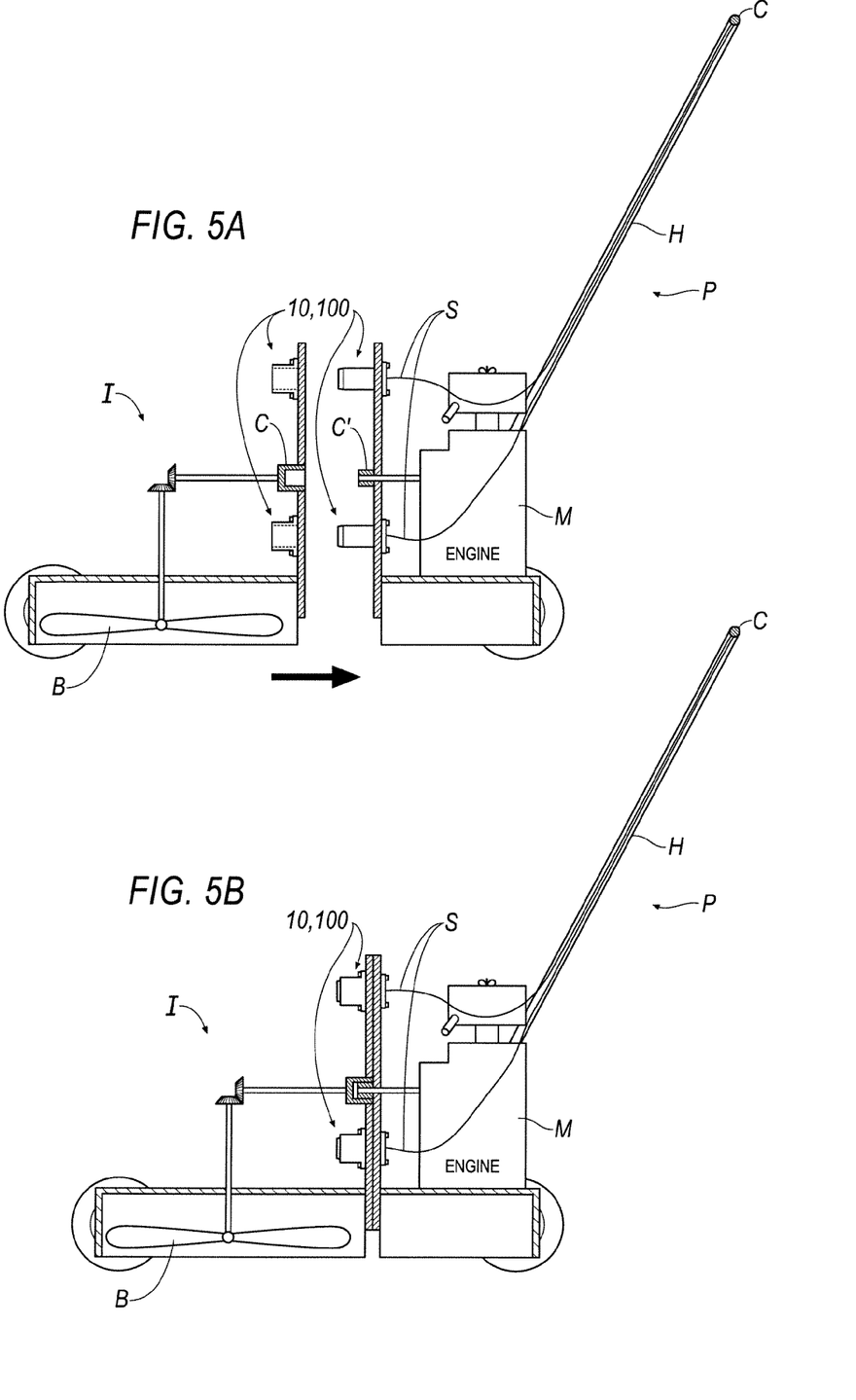
FIG. 5A is a cross-sectional view of the assembly of FIG. 4A in a disconnected state in accordance with an exemplary embodiment of the invention.
FIG. 5B is a cross-sectional view of the assembly in a connected state according to line 5B-5B of FIG. 4A.

As seen in FIGS. 5A and 5B, the prime mover, M, may be mechanically coupled to the implement, I, to drive a blade, B, working member, or the like of the implement, I. If desired, movement of the plunger 18, may be initiated through a controller, C, located on/proximate the handle, H. Accordingly, in an embodiment, such actuation of the controller, C, may pull/release the cable, S. In another embodiment, such actuation of the controller, C, may provide an electrical current to the solenoid 102. However, it will be appreciated that the controller, C, is not limited to pulling of the cable, S, or, the actuating of the solenoid 102 and that the controller, C, may interface with any desirable fastener design that results in the axial movement of the plunger 18.

Rotating coupler C, C' is comprised of a female portion C and a male portion C'. The coupler C, C' is rotatably supported by one or more rotatable bearings or the like (not shown) rendering both coupler halves C, C' free to rotate. Coupler C' is joined to a power output shaft driven by engine M and couples rotating energy from C' through C and ultimately to implement, I. Coupler halves C, C' have complementary geometries (such as C having a square female receptacle and C' shaped as a square male member adapted to be cooperatively received within square female receptacle C'). These complementary geometries allow couplers C, C' to operatively engage one another (i.e. transmit rotational power) when the implement, I is brought into contact with the power unit, P.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A fastener, comprising:
   a housing, wherein the housing forms a housing cavity, wherein the housing cavity includes a recess;
   a cage at least partially disposed in said housing cavity, wherein the cage defines:
   a cage cavity, and
   one or more passages aligned with said recess;
   one or more retaining members at least partially retained within said one or more passages;
   a plunger at least partially disposed in said cage cavity, wherein said plunger is at least partially movable within said cage cavity between:
      a first position to cause said one or more retaining members to be displaced radially outwardly thereby mechanically coupling said housing to said cage, and
      a second position to allow said one or more retaining members to be displaced radially inwardly thereby allowing said housing to be uncoupled from said cage; and a plunger actuator that is non-removably connected to the plunger;
   wherein said plunger includes a first axial end, a second axial end, and a side surface between the first and second axial ends, wherein the side surface includes:
   a first retaining member engagement surface, wherein the first retaining member engagement surface defines a first axial segment of the plunger having a first diameter,
   a second retaining member engagement surface, wherein the second retaining member engagement surface defines a second axial segment of the plunger to have a second diameter, wherein the second diameter is less than the first diameter, wherein contact of the one or more retaining member with the first retaining member engagement surface results in the one or more retaining members being displaced radially outwardly, wherein contact of the one or more retaining members with the second retaining member engagement surface results in the one or more retaining members being displaced radially inwardly;
   wherein the plunger is completely contained within the cage cavity, wherein the cage cavity includes an inner surface forming a cage cavity diameter, wherein the first retaining member engagement surface of the plunger always directly and constantly contacts the inner surface of the cage cavity, wherein the cage cavity diameter is substantially equal to but slightly greater than the first diameter defined by the first retaining member engagement surface;

an urging member for urging said plunger, wherein said urging member is completely contained within the cage cavity; and an end plug including a outer threaded surface, wherein the inner surface of the cage cavity includes an inner threaded surface, wherein the outer threaded surface of the end plug threadingly engages the inner threaded surface of the cage cavity, wherein the end plug at least partially closes said cage cavity and contacts said urging member;

wherein the plunger includes a neck portion having a first axial end, wherein the first axial end includes a receiving cavity for insertion of the plunger actuator into the plunger prior to the at least partial disposing of the plunger within the cage cavity, wherein the receiving cavity includes:

an axial opening defining an axial passage, wherein the receiving cavity further includes, a radial opening defining a radial passage, wherein the axial passage and the radial passage intersect;

wherein the plunger actuator includes:

a cable attached to an anchor, wherein the anchor is inserted into the radial opening and then disposed within the radial passage, wherein the cable passes through the axial passage and extends axially beyond the axial opening, wherein the end plug includes a passage, wherein said cable that extends axially beyond the axial opening passes through said end plug passage wherein the anchor is sized relative to the axial opening such that the anchor will not pass through the axial opening when the cable is pulled.

2. The fastener according to claim 1, wherein said side surface includes an intermediate retaining member engagement surface between the first and second retaining member engagement surfaces, wherein the intermediate retaining member engagement surface defines a third axial segment of the plunger having a frusto-conical shape.

3. The fastener according to claim 1, wherein the wherein the at least partial disposal of the plunger within the cage cavity results in the plunger actuator being non-removably connected to the plunger.

4. The fastener according to claim 1, wherein the direct contact of the first retaining member engagement surface of the plunger with the inner surface of the cage cavity provides means for preventing radial deviation of the plunger from an axis extending through the fastener as the plunger is being moved from a first position within the cage cavity to a second position within the cage cavity, wherein the movement of the plunger to first position results in the one or more retaining members being displaced radially outwardly for arranging the fastener in a locked orientation by coupling the cage and the housing, wherein the movement of the plunger to the second position results in the one or more retaining members being displaced radially inwardly for arranging the fastener in an unlocked orientation by uncoupling the cage and the housing.

5. An assembly, comprising:
a housing;
a ball cage;
a power unit attached to one of the housing and ball cage;
an implement attached to the other of the housing and ball cage, wherein the housing includes a housing cavity, wherein the housing cavity includes an inner annular recess, wherein the ball cage is disposed in said housing cavity, wherein the ball cage includes a ball cage cavity and one or more radial passages, wherein the one or more radial passages are aligned with said inner annular recess, wherein the ball cage cavity includes an inner surface forming a cage cavity diameter;

one or more balls retained within said one or more radial passages; and a plunger movably-disposed in said ball cage cavity, wherein an outer surface of the plunger is always in direct and constant contact with the inner surface of the ball cage cavity, wherein said plunger is movable in said ball cage cavity to:

a first position to cause said one or more balls to be displaced radially outwardly relative said one or more radial passages to seat said one or more balls in said inner annular recess to mechanically interlock said housing to said ball cage, and a second position to cause said one or more balls to be displaced radially inwardly relative said one or more radial passages to cause said one or more balls to be unseated from said inner annular recess to mechanically unlock said housing and said ball cage, wherein the direct contact of the outer surface of the plunger with the inner surface of the ball cage cavity provides means for preventing radial deviation of the plunger from an axis extending through the assembly as the plunger is moved from the first position or the second position;

wherein said plunger includes a first axial end, a second axial end, and a side surface between the first and second axial ends, wherein the side surface includes:

a first ball engagement surface, wherein the first ball engagement surface defines a first axial segment of the plunger having a first diameter, a second ball engagement surface, wherein the second ball engagement surface defines a second axial segment of the plunger to have a second diameter, wherein the second diameter is less than the first diameter, wherein contact of the one or more balls with the first ball engagement surface results in the one or more balls being displaced radially outwardly, wherein contact of the one or more balls with the second ball engagement surface results in the one or more balls being displaced radially inwardly;

wherein the side surface includes:
a neck portion, and
a shoulder portion, wherein the shoulder portion is between and substantially perpendicular to the neck portion and the first ball engagement surface;

a spring member concentrically disposed about the neck portion and disposed in said ball cage cavity, wherein the shoulder portion provides a seating surface for a first end coil of the spring member;

an end plug including a outer threaded surface, wherein the inner surface of the ball cage cavity includes an inner threaded surface, wherein the outer threaded surface of the end plug threadingly engages the inner threaded surface of the ball cage cavity, wherein the end plug closes out said ball cage cavity and contacts a second end coil of the spring member;

wherein the neck portion includes the first axial end, wherein the first axial end includes:

an axial opening defining an axial plunger passage, wherein the neck portion includes a radial opening defining a radial plunger passage, wherein the axial plunger passage and the radial plunger passage are in fluid communication with one another; and a plunger actuator including a string attached to an anchor, wherein the anchor is disposed in the radial plunger passage, wherein the string extends through the axial plunger passage and away from the plunger, wherein the end plug includes an axial end plug passage, wherein said string passes through said axial end plug passage.

6. The assembly according to claim 5, wherein the power unit includes:
a prime mover,
a handle, and
a plunger controller, wherein the implement is coupled to the prime mover.

7. The assembly according to claim 5, wherein the implement is selected from the group consisting of a lawn mover, a tiller, and a snow-thrower.

8. The assembly according to claim 5, wherein said side surface includes an intermediate ball engagement surface between the first and second ball engagement surfaces, wherein the intermediate ball engagement surface defines a third axial segment of the plunger having a frusto-conical shape.

9. The assembly according to claim 5, wherein the plunger actuator is non-removably connected to the plunger in an axial direction.

10. The assembly according to claim 9, wherein the disposal of the plunger within the ball cage cavity results in the plunger actuator being non-removably connected to plunger in the axial direction.

11. A fastener, comprising:
a housing, wherein the housing includes a housing cavity, wherein the housing cavity includes an inner annular recess;
a ball cage disposed in said housing cavity, wherein the ball cage includes:
a ball cage cavity, and
one or more radial passages aligned with said inner annular recess;
one or more balls retained within said one or more radial passages; and
a plunger movably-disposed within said ball cage cavity, wherein at least a portion of an outer surface of the plunger is always in direct, constant contact with an inner surface of the ball cage cavity to provide
means for preventing axial deviation of the plunger from an axis extending through the fastener while also limiting movement of the plunger within the ball cage cavity to be in one of a first axial direction and a second axial direction, wherein said plunger includes
means for radially displacing said one or more balls to mechanically interlock said housing and ball cage when the plunger is moved in the first axial direction, or
mechanically unlock said housing and ball cage when the plunger is moved in the second axial direction;
wherein the means includes:
a first ball engagement surface, wherein the first ball engagement surface defines a first axial segment of the plunger having a first diameter,
a second ball engagement surface, wherein the second ball engagement surface defines a second axial segment of the plunger to have a second diameter, wherein the second diameter is less than the first diameter, wherein contact of the one or more balls with the first ball engagement surface results in the one or more balls being displaced radially outwardly, wherein contact of the one or more balls with the second ball engagement surface results in the one or more balls being displaced radially inwardly;

wherein the plunger is movable in said ball cage cavity to a first position to cause said one or more balls to be displaced radially outwardly relative said one or more radial passages to seat said one or more balls in said inner annular recess to mechanically interlock said housing to said ball cage, and a second position to cause said one or more balls to be displaced radially inwardly relative said one or more radial passages to cause said one or more balls to be unseated from said inner annular recess to mechanically unlock said housing and said ball cage;

wherein said plunger includes a first axial end, a second axial end, and a side surface between the first and second axial ends, wherein the side surface includes the first ball engagement surface and the second ball engagement surface;

wherein said side surface includes an intermediate ball engagement surface between the first and second ball engagement surfaces, wherein the intermediate ball engagement surface defines a third axial segment of the plunger-having a frusto-conical shape;

wherein the side surface includes:
a neck portion, and
a shoulder portion, wherein the shoulder portion is between and substantially perpendicular to the neck portion and the first ball engagement surface;
a spring member concentrically disposed about the neck portion and disposed in said ball cage cavity, wherein the shoulder portion provides a seating surface for a first end coil of the spring member;
an end plug including a outer threaded surface, wherein the ball cage cavity includes an inner threaded surface, wherein the outer threaded surface of the end plug threadingly engages the inner threaded surface of the ball cage cavity, wherein the end plug closes out said ball cage cavity and contacts a second end coil of the spring member;
wherein the neck portion includes the first axial end, wherein the first axial end includes:
an axial opening defining an axial plunger passage, wherein the neck portion includes
a radial opening defining a radial plunger passage, wherein the axial plunger passage and the radial plunger passage are in fluid communication with one another; and
a string attached to an anchor, wherein the anchor is disposed in the radial plunger passage, wherein the string extends through the axial plunger passage and away from the plunger, wherein the end plug includes an axial end plug passage, wherein said string passes through said axial end plug passage.

12. The fastener according to claim 11, wherein the anchor is non-removably connected to the plunger in an axial direction.

13. The fastener according to claim 12, wherein the disposal of the plunger within the ball cage cavity results in the anchor being non-removably connected to the plunger in the axial direction.

* * * * *

UNITED STATES PATENT AND TRADEMARK OFFICE
CERTIFICATE OF CORRECTION

| | | |
|---|---|---|
| PATENT NO. | : 7,762,739 B2 | Page 1 of 1 |
| APPLICATION NO. | : 11/848917 | |
| DATED | : July 27, 2010 | |
| INVENTOR(S) | : Bradley V. Blanchard | |

It is certified that error appears in the above-identified patent and that said Letters Patent is hereby corrected as shown below:

At column 7, claim 3, line 41, delete the first instance of "wherein the".

Signed and Sealed this
Twenty-first Day of February, 2012

David J. Kappos
*Director of the United States Patent and Trademark Office*